(12) United States Patent
Castino et al.

(10) Patent No.: US 11,138,365 B2
(45) Date of Patent: Oct. 5, 2021

(54) PAGINATION OF DATA FILTERED AFTER RETRIEVAL THEREOF FROM A DATA SOURCE

(71) Applicant: INTERNATIONAL BUSINESS MACHINES CORPORATION, Armonk, NY (US)

(72) Inventors: Raimondo Castino, Rome (IT); Gabriele De Capoa, Rome (IT); Rossella De Gaetano, Rome (IT); Fabio Monopoli, Rome (IT)

(73) Assignee: International Business Machines Corporation, Armonk, NY (US)

( * ) Notice: Subject to any disclaimer, the term of this patent is extended or adjusted under 35 U.S.C. 154(b) by 726 days.

(21) Appl. No.: 15/887,320

(22) Filed: Feb. 2, 2018

(65) Prior Publication Data

US 2019/0243876 A1 Aug. 8, 2019

(51) Int. Cl.
*G06F 40/114* (2020.01)
*G06F 16/93* (2019.01)
*G06F 16/9535* (2019.01)
*H04L 29/06* (2006.01)

(52) U.S. Cl.
CPC ............ *G06F 40/114* (2020.01); *G06F 16/93* (2019.01); *G06F 16/9535* (2019.01); *H04L 63/0428* (2013.01)

(58) Field of Classification Search
CPC .... G06F 40/114; G06F 16/93; G06F 16/9535; H04L 63/0428
See application file for complete search history.

(56) References Cited

U.S. PATENT DOCUMENTS

| 7,197,568 | B2 | 3/2007 | Bourne et al. |
| 7,346,668 | B2 | 3/2008 | Willis |
| 7,685,191 | B1 * | 3/2010 | Zwicky ................. G06Q 30/02 707/706 |
| 8,533,176 | B2 | 9/2013 | Pandey et al. |
| 8,793,489 | B2 | 7/2014 | Polunin et al. |

(Continued)

OTHER PUBLICATIONS

Elastic, "Scroll: Client Support for Scrolling and Reindexing", Printed on Nov. 2, 2017, 7 Pages, Elasticsearch Reference [2.4], http://www.elastic.co/guide/en/elasticsearch/reference/2.4/search-request-scroll.html.

(Continued)

*Primary Examiner* — Aleksandr Kerzhner
*Assistant Examiner* — Maher N Algibhah
(74) *Attorney, Agent, or Firm* — Anthony M. Pallone

(57) ABSTRACT

A method is provided for retrieving data stored in a data source at pages having a predetermining size. A computing system receives a page request for requesting a new page, within data that are selected in the data source according to a query and are then to be filtered according to one or more filtering criteria external to the data source. A pagination structure (comprising an end point in the selected data of a last previously requested page that has been previously requested) is associated with the page request; the pagination structure is used to retrieve the data following the end point of the last previously requested page and to filter them into the new page. A computer program product for performing the method and a corresponding system are also provided.

20 Claims, 9 Drawing Sheets

(56) References Cited

U.S. PATENT DOCUMENTS

| | | | |
|---|---|---|---|
| 8,957,912 B2* | 2/2015 | Jardine-Skinner | G06F 16/9577 345/619 |
| 9,230,083 B2 | 1/2016 | Brooks et al. | |
| 9,514,199 B1* | 12/2016 | Deprey | G06F 16/957 |
| 9,563,878 B2 | 2/2017 | Malyshev et al. | |
| 9,633,074 B1* | 4/2017 | Sharma | G06F 16/248 |
| 10,706,450 B1* | 7/2020 | Tavernier | G06F 16/9535 |
| 2009/0282021 A1* | 11/2009 | Bennett | G06F 16/334 |
| 2013/0173655 A1* | 7/2013 | Hoots, III | G06F 16/957 707/769 |
| 2014/0040228 A1* | 2/2014 | Kritt | G06F 16/248 707/706 |
| 2014/0298155 A1* | 10/2014 | Rider | G06F 16/95 715/234 |

OTHER PUBLICATIONS

Mell et al., "The NIST Definition of Cloud Computing", Recommendations of the National Institute of Standards and Technology, NIST Special Publication 800-145, Sep. 2011, 7 pages.

Grace Period Disclosure: IBM, IBM Cloud Docs, IBM Cloud and Compute & Services, Sep. 30, 2017, 2 pages, https://console.bluemix.net/docs/.

* cited by examiner

PAGINATION OF DATA FILTERED AFTER RETRIEVAL THEREOF FROM A DATA SOURCE

STATEMENT REGARDING PRIOR DISCLOSURES BY THE INVENTOR OR A JOINT INVENTOR

Aspects of the present invention have been disclosed by the Applicant, who obtained the subject matter disclosed directly from the inventors, in the product IBM Cloud (formerly known as Bluemix®), made available to the public on Sep. 30, 2017.

BACKGROUND

The present disclosure relates to the information technology field. More specifically, this disclosure relates to the retrieval of data in a computing system.

Data retrieval typically requires writing and executing data retrieval or extraction commands or queries on a data store (e.g. a database). Based on the query provided, the database identifies and retrieves the data requested. Applications and software generally use various queries to retrieve data according to different formats. In addition to simple or smaller data, data retrieval can also include retrieving large amounts of data, usually in the form of reports.

BRIEF SUMMARY

A simplified summary of the present disclosure is herein presented in order to provide a basic understanding thereof; however, the sole purpose of this summary is to introduce some concepts of the disclosure in a simplified form as a prelude to its following more detailed description, and it is not to be interpreted as an identification of its key elements nor as a delineation of its scope.

In general terms, the present disclosure is based on the idea of saving information for paginating data that are filtered after their retrieval.

Particularly, an aspect provides a method for retrieving data stored in a data source at pages having a predetermining size. A computing system receives a page request for requesting a new page, within data that are selected in the data source according to a query and are then to be filtered according to one or more filtering criteria external to the data source. A pagination structure (comprising an end point in the selected data of a last old page that has been previously requested) is associated with the page request; the pagination structure is used to retrieve the data following the end point of the last old page and to filter them into the new page.

A further aspect provides a computer program for implementing the method.

A further aspect provides a corresponding computer program product.

A further aspect provides a corresponding system.

More specifically, one or more aspects of the present disclosure are set out in the independent claims and advantageous features thereof are set out in the dependent claims, with the wording of all the claims that is herein incorporated verbatim by reference (with any advantageous feature provided with reference to any specific aspect that applies mutatis mutandis to every other aspect).

BRIEF DESCRIPTION OF THE DRAWINGS

The solution of the present disclosure, as well as further features and the advantages thereof, will be best understood with reference to the following detailed description thereof, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes—such as value, content and representation). Particularly.

DETAILED DESCRIPTION

Figure 1A:
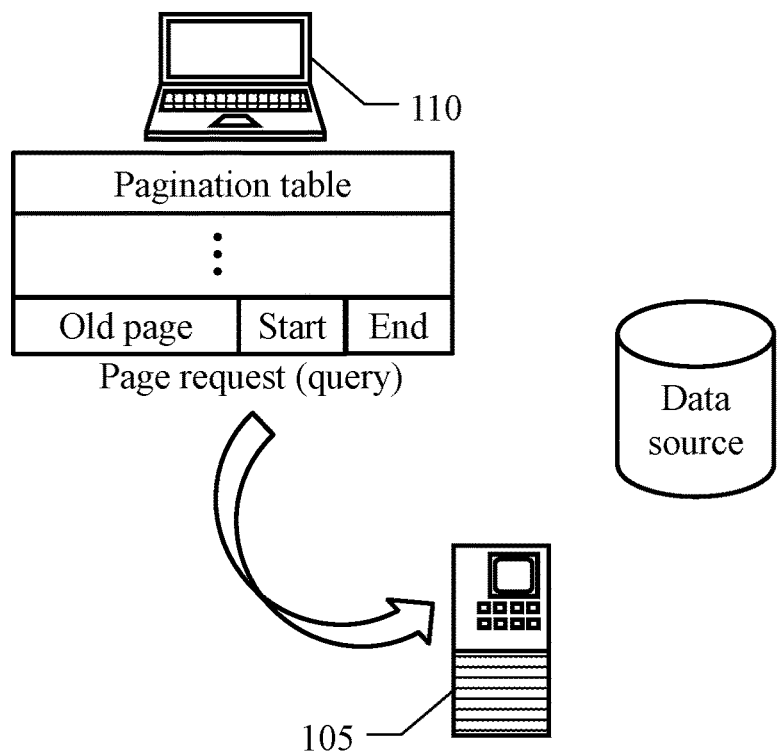
FIGS. 1A-FIG. 1D depict the general principles of the solution according to an embodiment of the present disclosure.

The background of the present disclosure is hereinafter introduced with the discussion of techniques relating to its context. However, even when this discussion refers to documents, acts, artifacts and the like, it does not suggest or represent that the discussed techniques are part of the prior art or are common general knowledge in the field relevant to the present disclosure.

Computing systems are a routinely used to retrieve data stored in corresponding data sources (for example, databases); for this purpose, queries are submitted to each data source to select the data (for example, records of databases) fulfilling corresponding searching criteria. The (selected) data that have been retrieved from the data source may be used for a number of purposes; particularly, in real-time applications the selected data are generally displayed onto a monitor for their viewing by a user requesting them. For example, the user may submit a query to the data source remotely by entering a corresponding command with a web browser; in response thereto, the query is executed onto the data source and the selected data are returned to the web browser for their display in a corresponding window.

The amount of data that are retrieved in response to each query may be very large. In this case, pagination techniques are commonly applied to divide the selected data into (discrete) pages of relatively small size; the pages may be displayed individually, with the possibility for the user of navigating up and down through them. Particularly, the pagination may be implemented directly at the level of the computing system in charge of retrieving the data. In this case, the data are retrieved from the data source at pages. For this purpose, a corresponding page request is submitted to the computing system for every page that is desired (with the page request that identifies the page, for example, by its size and offset from a beginning of the selected data). In response thereto, the query is run by limiting the data that are retrieved to the size of the page, starting from its offset; for example, this result is obtained by adding a clause to the query specifying that the records (fulfilling its searching criteria) are to be fetched starting from the one having a (progressive) index therein equal to the offset of the page and in a number equal to the size of the page. The page so obtained is then returned as a response to the page request. The pagination at the level of the computing system is especially advantageous when the queries are submitted to the computing system remotely, since it accordingly reduces the amount of data that are transmitted over a corresponding communication network (and then its traffic).

In some situations, it may be necessary to filter the selected data according to filtering criteria that are external to the data source. For example, this happens when access to the data is restricted by security polices, which define how the users are authorized to access the data; the security policies are generally highly variable in time, so that their incorporation into the data source may be unfeasible. In this situation, it is not possible to add the filtering criteria to the query (for example, because corresponding tables may not be combined with a join clause). Moreover, the filtering criteria may be implemented by Application Program Interfaces (APIs) of third parties in a way that is unknown from outside them. Therefore, the query is at first run to retrieve the selected data that fulfill its searching criteria; the selected data are then filtered by removing the ones that may not be returned.

However, in these situations it is very difficult (if not impossible) to apply pagination techniques. Indeed, the amount of data that remains after filtering the selected data is not known a priori. Therefore, for every page request it is now necessary to run the query and to filter the selected data always starting from the beginning thereof, until the corresponding page has been found. Therefore, the consumption of computing resources and the waiting time required to retrieve the page may become very high, more and more as the offset of the page increases. This is especially true when the data source is large; a typical example is in the case of big data, wherein their pagination with a tolerable response time is unfeasible with the computing resources that are commonly available.

With reference in particular to FIGS. 1A-FIG. 1D, the general principles are shown of the solution according to an embodiment of the present disclosure.

Starting from FIG. 1A, a computing system, for example, a server computing system or simply server 105 is used to retrieve data that are stored in a data source (for example, in the form of records). Particularly, the server 105 may be used to access big data. Big data are very large in volume (such as up to some petabytes); moreover, big data generally has high-velocity (since they are generated continually in real-time) and high-variety (since they may include text, images, audio and video).

The server 105 implements a pagination technique, wherein the data are retrieved by dividing them into (discrete) pages; the pages have a relatively small size (for example, of the order of some tens of records). In this way, every user accessing the data source may navigate up and down the pages (which are displayed individually). For this purpose, the user submits a page request to the server 105, for example, with a corresponding client computing system, or simply client 110; as usual, the page request specifies a query for selecting the data in the data source and a (new) page that is desired within them (for example, by its size and offset).

In the solution, according to an embodiment of the present disclosure, the page request is associated with a pagination structure, for example, a pagination table added to the page request. For any (old) pages that have been previously requested by the user for the same query, the pagination table includes a start point and an end point thereof in all the data that are selected by the query.

Figure 1B:
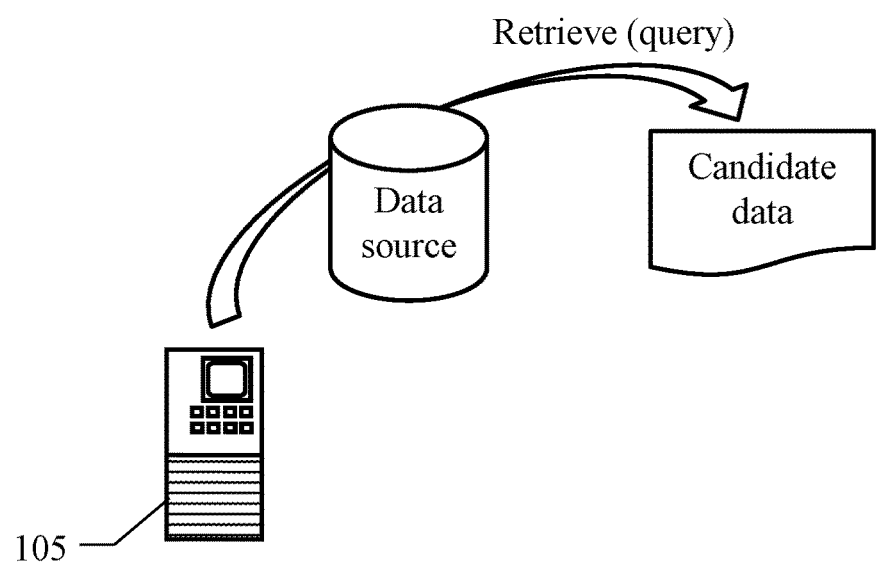

Continuing to FIG. 1B, the server 105 creates the new page (by repeating one or more times the following operations until it has been completed). Particularly, candidate data for the new page are retrieved from the data source. The candidate data are retrieved according to the query that is limited to a retrieval range that follows the end point of a last old page of the pagination table.

Figure 1C:
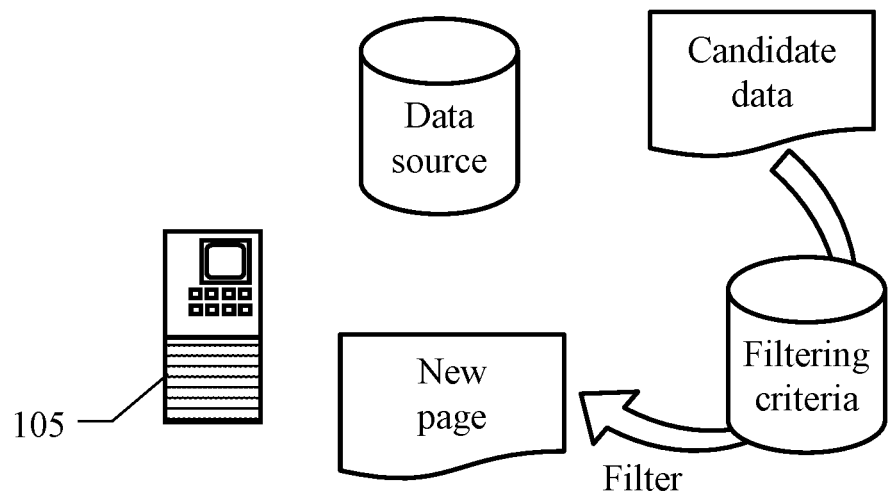

Continuing to FIG. 1C, the server 105 filters the candidate data into the new page according to one or more filtering criteria (for example, specifying an authorization of the user to access the data). The filtering criteria are external to the data source (for example, defined by security policies stored in a separate repository). The completion of the new page determines the start point and the end point (in all the data that are selected by the query) of one or more following pages, which follow the last old page up to the new page (consisting of the new page only when it follows the last old page directly).

Figure 1D:
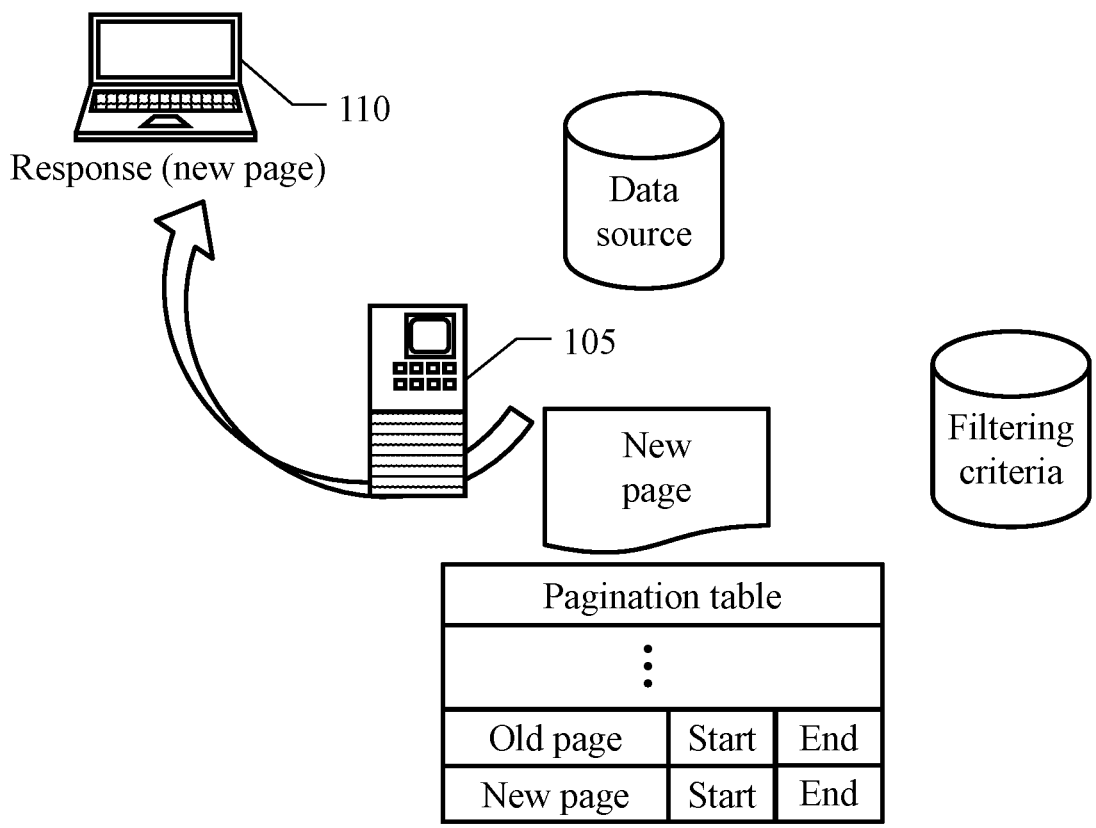

Continuing to FIG. 1D, the pagination table is updated accordingly; for example, the start point and the end point of the new page are added at the end of the pagination table (after the last old page). The server 105 then returns a response to the page request to the client 110. The response to the page request includes the new page (possibly with the addition of the updated pagination table). For example, this causes the display of the new page onto the client 110 for its viewing by the user.

The above-described solution allows paginating the data (at the level of the server 105) in this situation as well, i.e., even when the data that are selected by the query are then filtered according to filtering criteria that are external to the data source (so that it is not possible to add the filtering criteria to the query). Indeed, the pagination table allows leveraging information relating to the old pages that have already been determined (and particularly the end point of the last old page); as a result, for every page request it is now possible to avoid running the query and filtering the data always starting from the beginning thereof (since the new page may now be searched starting from the end point of the last old page). Particularly, in this way it is possible to start searching the new page directly from its beginning (when a match is available in the pagination table) or in any case as close as possible thereto (otherwise).

As a result, the consumption of computing resources (in the server 105) and the waiting time required to retrieve the new page (for the user of the client 110) is significantly reduced, and substantially independent of the offset of the new page. This is especially evident when the data source is large; particularly, the pagination is now feasible for big data as well, with a tolerable response time that may be obtained even with the computing resources that are commonly available.

The pagination that is made possible by the above-mentioned solution at the level of the server 105 is especially advantageous when the data are requested thereto from the client 110 remotely; indeed, this accordingly reduces the amount of data that are transmitted over a corresponding communication network (and then its traffic).

Figure 2:
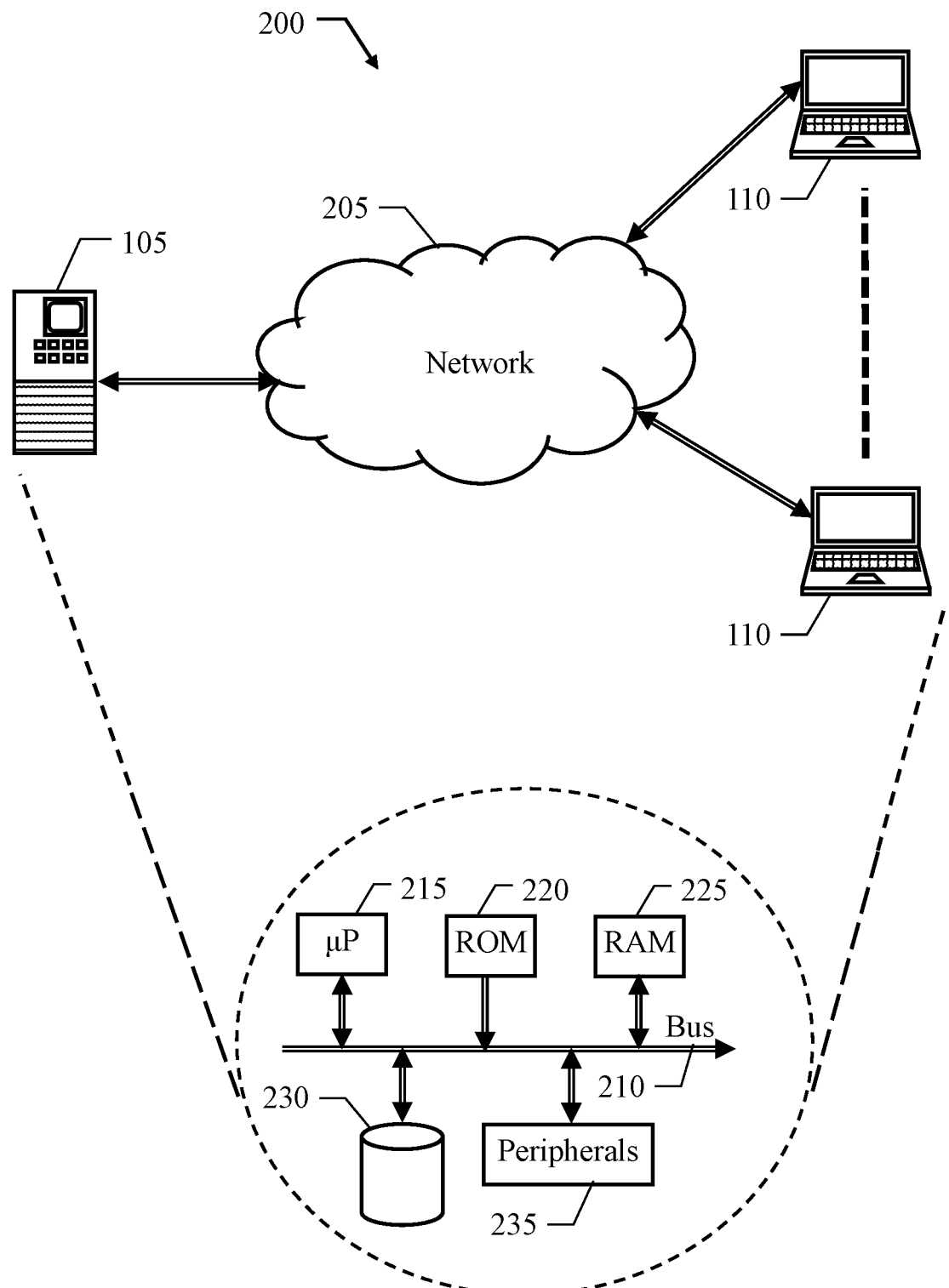
FIG. 2 depicts a schematic block diagram of a computing infrastructure wherein the solution according to an embodiment of the present disclosure may be practiced.

With reference now to FIG. 2, a schematic block diagram is shown of a computing infrastructure 200 wherein the solution according to an embodiment of the present disclosure may be practiced.

The computing infrastructure 200 is based on a client/server model, wherein one or more servers provide services to one or more clients; as far as relevant to the present disclosure, only the above-mentioned server 105 (used to retrieve data that are stored in the data source, not shown in the figure) and multiple instances of the client 110 (used to submit corresponding page requests to the server 105 by their users) are shown in the figure. Typically, the computing infrastructure 200 has a distributed architecture with the server 105 and the client's 110 that communicate among them over a communication network 205 (for example, of global type based on the Internet).

Each of the above-mentioned computing systems (server 105 and clients 110) includes several units that are connected among them, for example, through a bus structure 210 with one or more levels. Particularly, one or more microprocessors (μP) 215 control operation of the computing system 105,110; a non-volatile memory (ROM) 220 stores basic code for a bootstrap of the computing system 105,110 and a volatile memory (RAM) 225 is used as a working memory by the microprocessors 215. The computing system 105,110 is provided with a mass-memory 230 for storing programs and data (for example, storage devices of a data center (not shown in the figure) wherein the server 105 is implemented, and corresponding hard disks for the client's 110). Moreover, the computing system 105,110 includes a number of controllers for peripheral (or Input/Output, I/O) units 235; for example, the peripheral units 235 of the server 105 include a network adapter for plugging it into the data center and then to the communication network 205 through a switch/router sub-system of the data center (with a drive for reading/writing removable storage units, such as optical disks like DVDs, that is implemented by a console of the data center), whereas the peripheral units 235 of each client 110 include a keyboard, a mouse, a monitor, a network adapter for connecting to the communication network 205, and a drive for reading/writing removable storage units as above.

Figure 3:
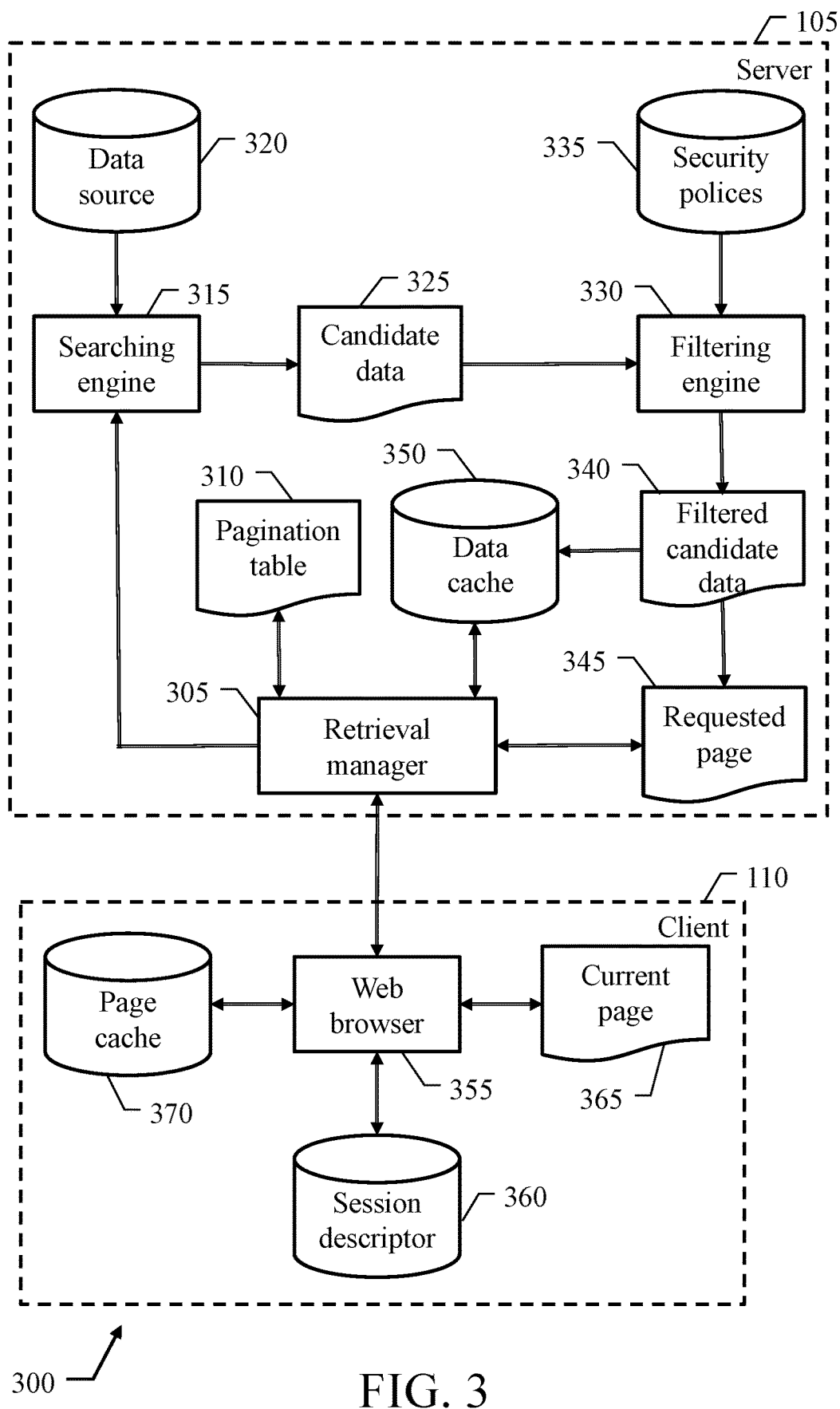
FIG. 3 depicts the main software components that may be used to implement the solution according to an embodiment of the present disclosure.

With reference now to FIG. 3, the main software components are shown that may be used to implement the solution according to an embodiment of the present disclosure.

All the software components (programs and data) are denoted as a whole with the reference 300. The software components are typically stored in the mass memory and loaded (at least partially) into the working memory of each computing system when the programs are running, together with an operating system and other application programs (not shown in the figure). The programs are initially installed into the mass memory, for example, from removable storage units or from the communication network. In this respect, each program may be a module, segment or portion of code, which includes one or more executable instructions for implementing the specified logical function.

Starting from the server 105, it includes the following components.

A retrieval manager 305 manages the retrieval of the data requested by the users of the client's 110. For this purpose, the server 105 and each client 110 communicate between them with a stateless protocol (such as the HTTP in the Internet); in this case, the server 105 processes each request submitted thereto independently without retaining any (session) information relating to any requests that have been processed previously.

Particularly, the retrieval manager 305 receives every page requests submitted by the users of the clients 110. As usual, each page request indicates the user, a query for selecting the data in the data source, hereinafter indicated as selected data, and a (requested) page within the selected data after they have been filtered, hereinafter indicated as filtered selected data; for example, the selected page is identified by its offset (defined by the position of the first record of the requested page from the beginning of the filtered selected data, starting from 0) and its size (with the offset that is equal to the number of the requested page, starting from 0, multiplied by its size). In the solution, according to an embodiment of the present disclosure, the page request further includes the corresponding pagination table. The pagination table includes the (common) size of all the old pages, which have been previously requested for the query by the user. Moreover, the pagination table includes a row for each old page (whose progressive number, starting from 0, identifies it); in turn, the row includes the offset of the old page (also equal to the number of the old page multiplied by its size), its start point and end point in the selected data, before their filtering (i.e., the (enumeration) indexes, starting from 0, of the first record and of the last record, respectively, of the old page in the fetching of the selected data).

The retrieval manager 305 controls the following components for any (pending) page request that is under processing by it.

Particularly, the retrieval manager 305 temporarily saves the pagination table, denoted with the reference 310 (for its use to create the requested page and to update it accordingly).

A searching engine 315 retrieves the data corresponding to every page requests. For this purpose, the searching engine 315 accesses (in read mode) the data source, denoted with the reference 320. For any pending page request, the searching engine 315 temporarily saves a last version of the candidate data 325 for the requested page (which have been retrieved from the data source 320 by running the corresponding query suitably limited); the candidate data 325 includes a row for each record that has been retrieved from the data source 320, associated with its index in the selected data corresponding to the query.

A filtering engine 330 filters the data corresponding to every page requests. For this purpose, the filtering engine 330 accesses (in read mode) a security policy repository 335. The security policy repository 335 stores the security policies that apply to the data source 320, which security policies define the filtering criteria to be applied to the data that are retrieved therefrom. For example, the security policies are defined at the level of one or more groups of users. For each group, the security policies specifies any users (authorized to access the data source 320) that belong to the group and the type of data that its users are not authorized to access (as indicated by one or more characterizing properties thereof); for example, the groups refer to different type of users (such as technicians, salesmen, buyers, managers, executives) having corresponding levels of authorizations (for example, with the technicians that have access to technical information only, the salesmen that have access to information relating to their customers only, the managers that have access to information relating to their departments only, whereas no restriction applies to the executives). For any pending page request, the filtering engine 330 accesses (in read mode) its candidate data 325 and temporarily saves the corresponding filtered candidate data 340 (which have been obtained by filtering the candidate data 325 according to the filtering criteria of the user); the filtered candidate data 340 includes a row for each record that has been retrieved and filtered, associated with its index in the selected data corresponding to the query and its offset in the filtered selected data.

The filtered candidate data 340 are used to create the requested page 345 (comprising rows for the corresponding records that have been retrieved and filtered). The filtered candidate data 340 are also used to populate a data cache 350. The data cache 350 includes data that have been retrieved and filtered for previous page requests but have not been used to create the corresponding requested pages. The data cache 350 has one row for each of these records, associated with its index in the selected data corresponding to the query, its offset in the filtered selected data and its user and query.

The retrieval manager 305 returns responses for every page requests to the corresponding clients 110. As usual, the response to each page request includes the requested page that has been requested by the user of the client 110. In the solution according to an embodiment of the present disclosure, the response to the page request further includes the corresponding (updated) pagination table, as updated according to any following pages (following the last old page thereof) that have been retrieved from the data source for creating the requested page.

Moving to each client 110 (only one shown in the figure), it includes the following components.

The user of the client 110 exploits a web browser 355 to surf the Internet. As far as relevant to the present disclosure, the web browser 355 is used to access the retrieval manager 305 for retrieving data from the data source 320. Particularly, during every (data retrieval) session for a specific query, the selected data of the query are retrieved at pages, by submitting corresponding page requests to the retrieval manager 305. For any (opened) session that is in progress, the web browser 355 controls (in read/write mode) a session descriptor 360 storing information relating to the session. Particularly, the session descriptor 360 includes the query, the size of the pages and the pagination table; the pagination table (excluded when empty at its creation) is encrypted with an encryption key of the retrieval manager 305 (for example, a secret key thereof). The web browser 355 temporary saves a (current) page 365 that is displayed at the moment in its window. Moreover, the web browser 355 accesses (in read/write mode) a page cache 370. As usual, the page cache 370 stores web pages that have been previously downloaded from the Internet. Particularly, the page cache 370 includes one or more (old) pages that have been retrieved from the server 105, each one associated with its query.

Figure 4A:
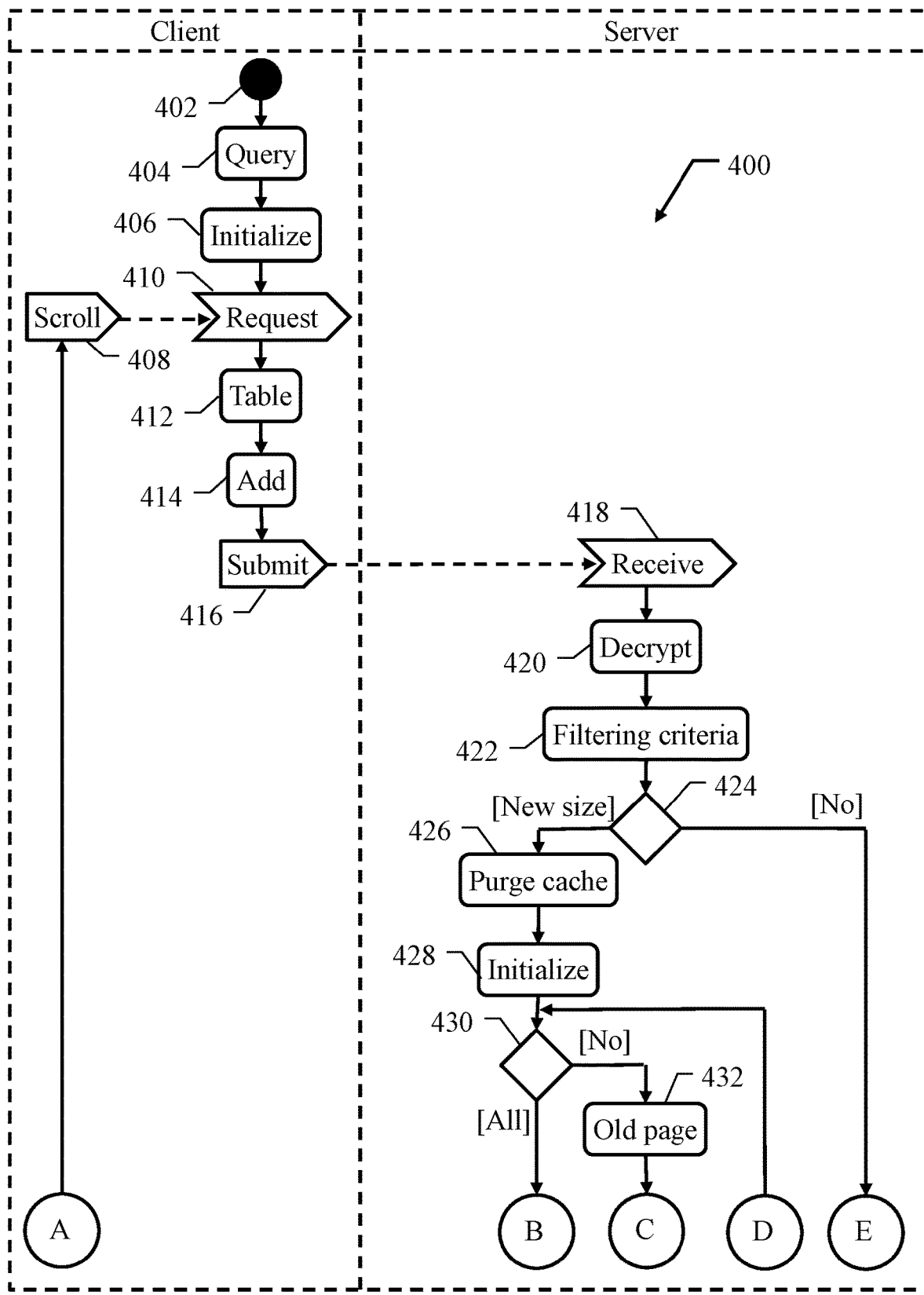
FIGS. 4A-FIG. 4C depict an activity diagram describing the flow of activities relating to an implementation of the solution according to an embodiment of the present disclosure.
Figure 4B:
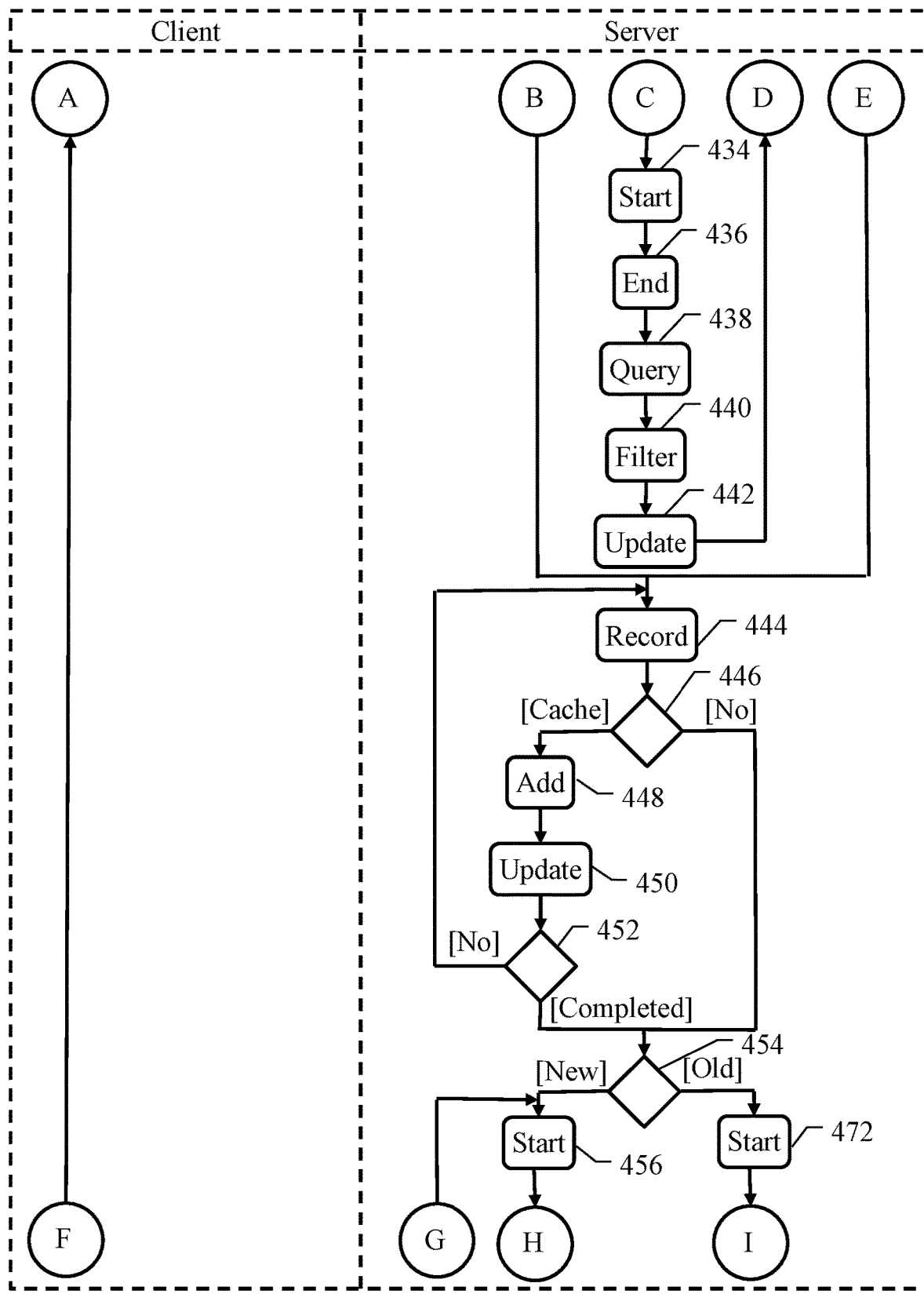
Figure 4C:
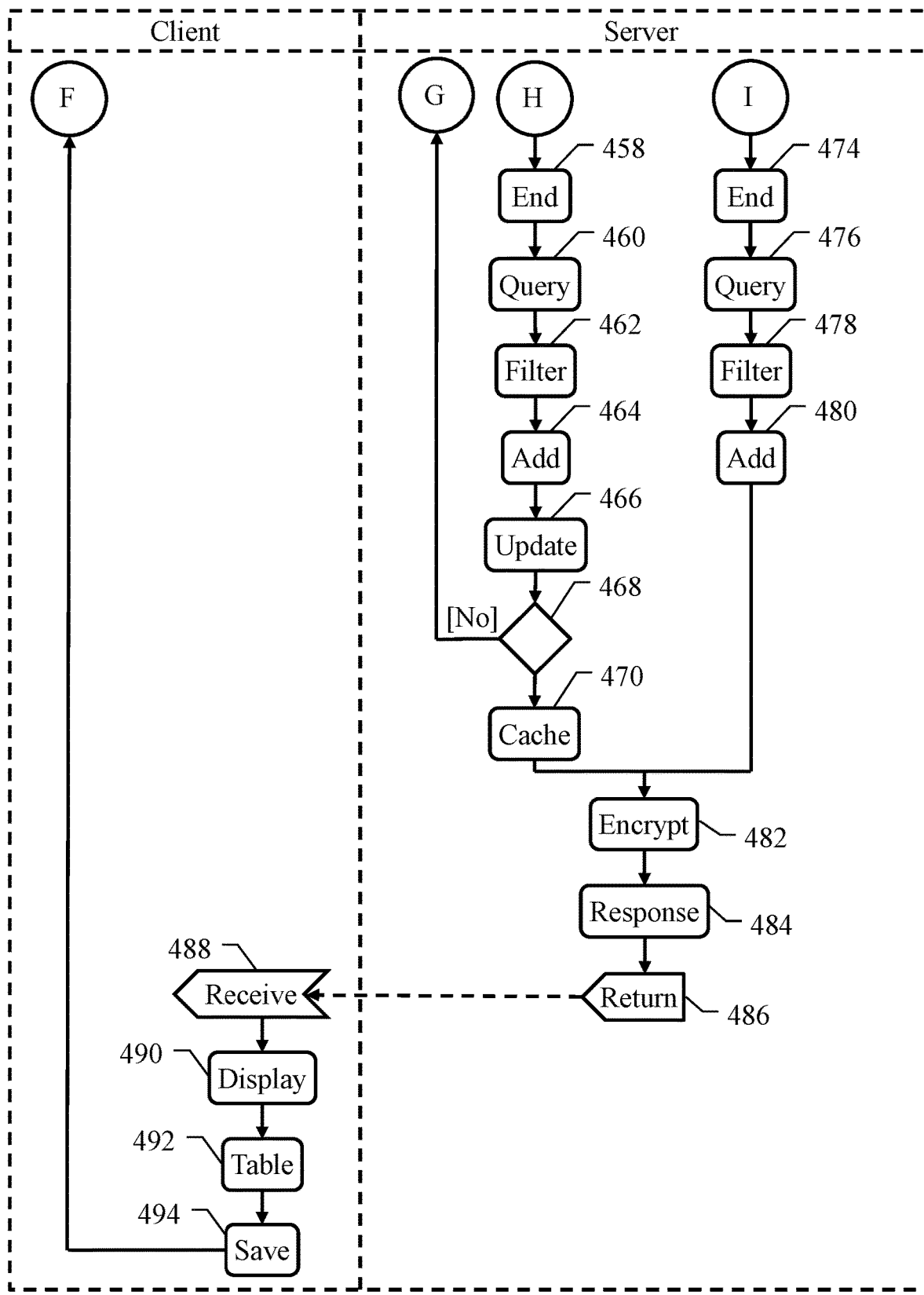

With reference now to FIG. 4A-FIG. 4C, an activity diagram is shown describing the flow of activities relating to an implementation of the solution according to an embodiment of the present disclosure.

Particularly, the diagram represents an exemplary process that may be used to retrieve data by the user of a generic client from the server with a method 400. In this respect, each block may correspond to one or more executable instructions for implementing the specified logical function on the corresponding scheduling/execution server.

The process begins at the black start circle 402 in the swim-lane of the client, and then passes to block 404 as soon as its user submits a query for the data source into the web browser (after accessing the retrieval manager and possibly authenticating with it). For example, the user may choose one or more selection criteria and a desired order of the data (for example, in corresponding pull-down menus) and then presses a submit button; in this phase, the user may also choose a size of the pages for the retrieval of the data (set to a default value otherwise). In response thereto, the web browser at block 406 creates a new session descriptor for the corresponding (opened) session, by adding the query (for example, with a where clause indicating the selection criteria and an order clause indicating the desired order), the size of the pages and the pagination table (empty at the beginning). Later on, the user at block 408 may navigate up and down through the filtered selected data that are apparently available in the corresponding window of the web browser (for example, by means of scrolling commands), thereby moving to a different page therein. At the same time, the user may also change the size of the pages; in this case, the web browser accordingly updates the size of the pages into the session descriptor.

The process then continues to block 410 from either the block 406 or the block 408. In any case, the web browser creates a (new) page request for a corresponding requested page as usual (assuming that the requested page is not available in the page cache so that it may not be retrieved directly from it); the page request indicates the user (logged into the retrieval manager), the query (extracted from the session descriptor), the requested page by its offset (at the beginning set to the first one (offset 0) and later on set to the one to which the user has moved) and the size of the requested page (extracted from the session descriptor). In the solution, according to an embodiment of the present disclosure, the web browser at block 412 retrieves the (encrypted) pagination table from the session descriptor. The web browser at block 414 adds the pagination table to the page request. For example, the pagination table is embedded into a hidden field of the page request; in this way, compatibility is ensured of the web browser with servers that do not support the proposed solution (since they may process the page request as usual, with the addition of the pagination table that is completely opaque thereto). The web browser at block 416 submits the page request so obtained to the retrieval manager.

Moving to the swim-lane of the server, the retrieval manager receives this page request at block 418 (wherein it is listening for any page requests submitted thereto by all the clients). In response thereto, the retrieval manager at block 420 extracts the user, the query, the requested page, its size and the (encrypted) pagination table from the page request. The retrieval manager then decrypts the pagination table with its encryption key. At this point, the retrieval manager verifies whether the data source has changed after the creation of the pagination table, for example, as indicated by a timestamp thereof; in this case, the retrieval manager clears the pagination table since it is not valid any longer (because the change of the data source may have caused the addition/removal of records in the selected data). Moreover, the retrieval manager at block 422 commands the filtering engine to retrieve the filtering criteria of the user from the security policy repository.

The retrieval manager at block 424 compares the size of the requested page with the size of the old pages, if any, of the pagination table. If the size of the requested page differs from the size of the old pages (meaning that the size of the pages has been changed) and the pagination table is not empty, the retrieval manager at block 426 invalidates any rows of the data cache associated with the user and the query, since they might be not useful any longer. The retrieval manager at block 428 initializes a fresh version of the pagination table, or simply fresh pagination table, with corresponding fresh version of the old pages, or simply fresh old pages, for the (fresh) size of the requested page, defined by the size of the requested page; the fresh pagination table is intendent to replace the original version of the pagination table, or simply original pagination table, with its original version of the old pages, or simply original old pages, for their (original) size. Particularly, the fresh size is added to the fresh pagination table. Moreover, a number of the fresh old pages corresponding to the original old pages is determined according to the fresh size; for this purpose, the number of the fresh old pages is set to the integer value of a number of records of the original old pages (equal to their number multiplied by the original size) divided by the fresh size. Corresponding (empty) rows are then added to the fresh pagination table for the fresh old pages (with the start point of the first fresh old page, if any, that is set to the beginning of the selected data, index=0). A loop is then entered for populating the fresh pagination table. The loop begins at block 430, wherein the retrieval manager verifies whether all the fresh old pages have been processed. If not, the retrieval manager at block 432 takes a (current) fresh old page into account (starting from the first one) and then a (current) pair of fresh old pages formed by this (first) fresh old page and the following (second) fresh old page (if any); the retrieval manager adds the offset of the first and second fresh old pages (equal to their number multiplied by the fresh size) to the fresh pagination table. A retrieval range in the selected data for the pair of fresh old pages is then determined. Particularly, the retrieval manager at block 434 sets a start point of the retrieval range to the start/end point of the original old page immediately before the second fresh old page according to their offsets, if any (or to the start point of the first fresh old page plus a multiple of the fresh size otherwise). The retrieval manager at block 436 sets an end point of the retrieval range to the start/end point of the original old page immediately after the first fresh old page according to their offsets. For example, in a very simple case wherein the original pagination table includes 5 original old pages each of 10 rows and the fresh size is of 15 rows, the fresh pagination table will include INT(5*10/15)=3 fresh old pages; the start point of the $1^{st}$ fresh old page (0) is equal to the start point of the $1^{st}$ original old page (0), the end point of the $1^{st}$ fresh old page (14) and the start point of the $2^{nd}$ fresh old page (15) are searched from the start point of the $2^{nd}$ original old page (10) and the end point of the $2^{nd}$ original old page (19), the end point of the $2^{nd}$ fresh old page (29) is equal to the end point of the $3^{rd}$ original old page (29) and the start point of the $3^{nd}$ fresh old page (30) is searched from there to the end point of the 4th original old page (39), and the end point of the $3^{rd}$ fresh old page (44) is searched from the end point of the 4th original old page (39) to the start point of the 5th original old page (49). In this way, the retrieval range is as small as possible around the passage from the first fresh old page to the second fresh old page. The retrieval manager at block 438 commands the searching engine to retrieve the candidate data for the pair of fresh old pages; the candidate data are retrieved according to the query limited to the retrieval range (i.e., by updating the query with the addition of a clause specifying that the records fulfilling its searching criteria are to be fetched starting from the one having the index in the selected data equal to the start point of the retrieval range and in a number equal to the difference between the end point and the start point of the retrieval range). The retrieval manager at block 440 commands the filtering engine to filter the candidate data according to the filtering criteria of the user, so as to obtain the corresponding filtered candidate data. The retrieval manager at block 442 updates the fresh pagination table accordingly. Particularly, the end point of the first fresh old page is set to the index of the last record thereof in the filtered candidate data (having the offset equal to the offset of the first fresh old page plus the fresh size); moreover, the start point of the second fresh old page (if any) is set to the index of the first record thereof in the filtered candidate data (having the offset equal to the offset of the second fresh old page). The flow of activity then returns to the block 430 to repeat the same operations. A soon as all the fresh old pages have been processed, the loop is exit by descending from the block 430 into block 444; the same point is also reached directly from the block 424 when the size of the requested page is the same as the size of the old pages (meaning that the size of the pages has not been changed) or the pagination table is empty. In this way, the consumption of computing resources and the time required in the server to create the fresh pagination table are relatively low (since the retrieval of the data from the data source is limited to the small retrieval ranges only).

A loop is now entered for retrieving the (following) pages, which follow the last old page in the pagination table up to the requested page, from the data cache as far as possible. The loop begins at the block 444 wherein the retrieval manager takes a (current) row of the following pages into account (starting from the first one). The retrieval manager at block 446 verifies whether the data cache includes a row corresponding to the row of the following pages (i.e., the row of the data cache has the same user and query as the page request and it has the offset equal to the one of the row of the following pages). If so and the offset of the row in the data cache belongs to the requested page (i.e., it is comprised between the offset of the requested page and the offset of the requested page plus its size), the retrieval manager at block 448 adds the record from this row of the data cache to the corresponding (first free) row of the requested page. The retrieval manager at block 450 updates the pagination table accordingly (if necessary). Particularly, if the row of the data cache is the first row of one of the following pages, a row is added to the pagination table for the following page with the addition of its offset and with the start point set to the index of the row in the data cache; instead, if the row of the data cache is the last row of one of the following pages, its end point in the pagination table is set to the index of the row in the data cache. A test is made at block 452, wherein the retrieval manager verifies whether the requested page has been completed. If not, the flow of activity returns to the block 444 to repeat the same operations for a next row of the following pages. The loop is exit by descending into block 454 from the block 446 (when the data cache does not include any more row of the following pages) or from the block 452 (when the requested page has been completed).

At this point, the retrieval manager verifies whether the requested page is included in the pagination table. If the pagination table does not include any old page having the offset equal to the one of the requested page (meaning that the requested page is a new page that has not been requested before), a loop is entered for retrieving the (following) pages that follow the last old page in the pagination table up to the requested page. The loop begins by determining a retrieval range in the selected data for retrieving the following pages. Particularly, the retrieval manager at block 456 sets a start point of the retrieval range. At a first iteration of the loop, if at least part of the following pages has already been retrieved from the data cache the start point of the retrieval range is set to follow the index (index+1) of the last record of the following pages that have been retrieved from the data cache, as indicated in the corresponding row thereof, whereas otherwise the start point of the retrieval range is set to follow (index+1) the end point of the last old page in the pagination table if any or to the beginning of the selected data (index=0) if the pagination table is empty. At any following iteration of the loop, instead, the start point of the retrieval range is set to follow the end point (index+1) of the candidate data of a previous iteration of the loop. The retrieval manager at block 458 sets an end point of the retrieval range according to a number of (missing) records that are still to be retrieved for completing the following pages; the number of missing records is equal to the difference between the offset of the requested page and the offset of the last old page at a first iteration of the loop, and it is reduced by a number of the rows of the filtered candidate data at any following iteration of the loop. For example, the end point of the retrieval range is set to its start point plus a multiple of the number of missing records, such as 1.5-3.0 times (to take into account the filtering of the selected data). The retrieval manager at block 460 commands the searching engine to retrieve the candidate data for the following pages from the data source; the candidate data are retrieved according to the query limited to the retrieval range as above. The retrieval manager at block 462 commands the filtering engine to filter the candidate data according to the filtering criteria of the user, so as to obtain the corresponding filtered candidate data. If the filtered candidate data includes any rows of the requested page (i.e., the rows of the filtered candidate data have the offsets comprised between the offset of the requested page and the offset of the requested page plus its size), the retrieval manager at block 464 adds the records from these rows to the corresponding (first free) rows of the requested page. The retrieval manager at block 466 updates the pagination table accordingly (if necessary). Particularly, if the filtered candidate data includes a row containing the first record of one of the following pages (i.e., its offset is equal to the offset of the following page), the start point of the following page is set to the index of this row of the filtered candidate data; moreover, if the filtered candidate data includes a row containing the last record of one of the following pages (i.e., its offset is equal to the offset of the following page plus its size), the end point of the following page is set to the index of this row of the filtered candidate data. A test is made at block 468, wherein the retrieval manager verifies whether the requested page has been completed or the end of the selected data has been reached. If not, the flow of activity returns to the block 456 to repeat the same operations. The loop is exit by descending into block 470 from the block 468 as soon as the requested page has been completed or the end of the selected data has been reached. At this point, the retrieval manager adds any rows remaining in the filtered candidate data to the data cache, in association with the user and the query. The use of the data cache improves the performance, since next page requests may exploit (at least in part) the data that have already been retrieved and filtered for previous page requests.

Referring back to the block 454, if the pagination table includes an old page having the offset equal to the one of the requested page (meaning that the requested page is equal thereto), the requested page is retrieved in a retrieval range that is determined directly according to the information available in the pagination table for the corresponding (current) old page. Particularly, the retrieval manager at block 472 sets a start point of the retrieval range to the start point of the old page (extracted from the pagination table). Likewise, the retrieval manager at block 474 sets an end point of the retrieval range to the end point of the old page (extracted from the pagination table). The retrieval manager at block 476 commands the searching engine to retrieve the candidate data for the requested page from the data source; the candidate data are retrieved according to the query limited to the retrieval range as above. The retrieval manager at block 478 commands the filtering engine to filter the candidate data according to the filtering criteria of the user, so as to obtain the corresponding filtered candidate data. The retrieval manager at block 480 adds the records from all the rows of the filtered candidate data to the corresponding rows of the requested page. In this case, the retrieval of the requested page is even faster, since only the amount of data that are strictly necessary to create it are retrieved from the data source.

The flow of activity merges again at block 482 from either the block 470 or the block 480; at this point, the retrieval manager encrypts the (possibly updated) pagination table with its encryption key. The retrieval manager at block 484 generates a response to the page request by adding the requested page as usual; in the solution, according to an embodiment of the present disclosure, the retrieval manager further adds the (encrypted) pagination table to the response to the page request (for example, again into a hidden field). The retrieval manager at block 486 returns the response to the page request to the web browser of the client. The encryption of the pagination table adds security to the proposed solution. Indeed, this prevents (or at least strongly hinders) malicious attacks to either the client (by modifying the pagination table to cause the server to retrieve wrong data in the requested page) or the server (by modifying the pagination table to cause denial of service attacks).

Referring back to the swim-lane of the client, the web browser receives the response to the page request at block 488 (wherein it is listening for it from the block 416). In response thereto, the web browser at block 490 extracts the requested page from the response and displays it into the corresponding window onto the monitor of the client. Moreover, the web browser at block 492 extracts the (encrypted) pagination table from the response to the page request. The web browser at block 494 saves the pagination table into the session descriptor (if it is necessary) by replacing its previous version. The flow of activity then returns to the block 408 to repeat the same operations continuously (until the user closes the corresponding windows and then the session).

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. In any case, each numerical value should be read as modified by the term about (unless already done) and each range of numerical values should be intended as expressly specifying any possible number along the continuum within the range (comprising its end points). Moreover, ordinal or other qualifiers are merely used as labels to distinguish elements with the same name but do not by themselves connote any priority, precedence or order. The terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a method for retrieving data that are stored in a data source. However, the data may be of any type (for example, multimedia data, simple text) and size (for example, big data, standard data), and they may be stored in any data source (for example, any number and type of local/remote databases).

In an embodiment, the data are retrieved at pages having a predetermining size. However, the pages may have any size (either fixed or variable).

In an embodiment, the method includes receiving by a computing system a page request for requesting a new page. However, the computing system may be of any type (see below); moreover, the page request may be of any type (for example, identifying the new page by its offset, number) and it may be received in any way (for example, remotely, locally).

In an embodiment, the new page is within selected data that are selected in the data source according to a query. However, the query may be of any type (for example, for a relational database, unstructured data).

In an embodiment, the page request is associated with a pagination structure. However, the pagination structure may be of any type (for example, a table, a complex data type) and it may be associated with the page request in any way (for example, comprised in the page request or cached into the computing system in case of a stateless protocol, stored into the computing system for a corresponding session in case of a stateful protocol).

In an embodiment, the pagination structure includes an end point in the selected data of a last of one or more old pages within the selected data that have been previously requested. However, the old pages may be in any number and their end points may be defined in any way (for example, by enumeration indexes, pointers).

In an embodiment, the method includes retrieving by the computing system candidate data for one or more following pages that follow the last old page up to the new page. However, the following pages may be in any number (down to the new page only).

In an embodiment, the candidate data are retrieved according to the query that is limited to a retrieval range following the end point of the last old page. However, the query may be limited in any way (for example, by updating it with any additional clause); the retrieval range may have any extent (either dynamic or static) that is defined in any way (for example, start point and end point, start point and extent). Moreover, the candidate data may be retrieved with any number of runs of the query (down to a single one).

In an embodiment, the method includes filtering by the computing system the candidate data into the new page according to one or more filtering criteria external to the data source. However, the filtering criteria may be in any number and of any type (for example, based on security policies, individual authorizations, hierarchical roles, APIs of third parties) and they may be fixed or determined in any way (for example, according to the user, the location, the time).

In an embodiment, the filtering of the candidate data determines the end point of the new page. However, the end point may be determined for the new page only or for all the following pages in any way (for example, incrementally or all together).

In an embodiment, the method includes causing by the computing system the pagination structure to be updated into an updated pagination structure according to the end point of the new page. However, the pagination structure may be updated in any way (for example, directly on the computing system or indirectly by returning a delta thereof to another computing system that updates it accordingly).

In an embodiment, the method includes returning by the computing system a response to the page request comprising the new page. However, the response may be returned in any way (for example, remotely or locally).

In the embodiment, the method includes receiving by the computing system the page request associated with the pagination structure that includes a start point and the end point in the selected data of each of the old pages. However, start points may be defined in any way (either the same or different with respect to the end points); in any case, the pagination structure may have any level of completeness (from the end point of the last old page only to the start point and/or the end point of all the old pages).

In an embodiment, the method includes filtering by the computing system the candidate data into the filtering pages according to the filtering criteria thereby determining the start point and the end point of the following pages. However, the start points of the following pages may be determined in any way (either the same or different with respect to the end points); in any case, the possibility of determining the end points only is not excluded.

In an embodiment, the method includes causing by the computing system the pagination structure to be updated into the updated pagination structure according to the start point and the end point of the following pages. However, this step may also be omitted when only the end points are taken into account.

In an embodiment, the method includes displaying the new page onto a monitor in response to the response to the page request. However, the new page may be displayed in any way (for example, onto the same computing system or onto another one), or more generally it may be used for any purpose (for example, displaying, printing, storing or any combination thereof).

In an embodiment, the method includes receiving by the computing system the page request from a further computing system over a communication network. However, the further computing system and the communication network may be of any type (see below).

In an embodiment, the method includes returning by the computing system the response to the page request to the further computing system over the communication network. However, the response to the page request may be returned in any way (according to how the page request has been received).

In an embodiment, the method includes receiving by the computing system the page request comprising the pagination structure. However, the pagination structure may be added to the page request in any way (for example, in a hidden field, queued thereto), entirely or only in part (down to the end point of the last old page only).

In an embodiment, the method includes returning the response to the page request comprising the updated pagination structure. However, the pagination structure may be added to the response to the page request in any way (either the same or different with respect to the page request);

moreover, it is possible to return the whole updated pagination table or a delta thereof only.

In an embodiment, the method includes receiving by the computing system the page request comprising the pagination structure in encrypted form. However, the pagination structure may be encrypted in any way (for example, with a secret key or a public key of the computing system, blurring techniques or any combination thereof); in any case, the possibility is not excluded of providing the pagination structure in clear form (for example, in a protected environment).

In an embodiment, the method includes decrypting by the computing system the pagination structure included in the page request. However, the pagination structure may be decrypted in any way (according to its encryption).

In an embodiment, the method includes encrypting by the computing system the updated pagination structure to put the updated pagination structure in encrypted form. However, the updated pagination structure may be encrypted in any way (for example, always the same or changing over time).

In an embodiment, the method includes returning by the computing system the response to the page request comprising the updated pagination structure in encrypted form. However, in this case as well the possibility is not excluded of providing the updated pagination structure in clear form.

In an embodiment, the method includes iterating by the computing system a loop until the new page has been completed. However, the loop may be iterated any number of times (down to one only).

In an embodiment, the loop includes retrieving by the computing system the candidate data according to the query that is limited to the retrieval range following the end point of the last old page (at a first iteration of the loop) or an end point of the candidate data of a previous iteration of the loop (otherwise) and having an extent corresponding to missing data for completing the new page. However, the extent of the retrieval range may be determined in any way according to the missing data (for example, according to any multiplicative factor down to 1).

In an embodiment, the method includes receiving by the computing system the page request for a user. However, the user may be associated with the page request in any way (for example, by its identifier in the page request, following a login to the server); in any case, the possibility is not excluded of receiving anonymous page requests.

In an embodiment, the method includes determining by the computing system the filtering criteria according to the user. However, the filtering criteria may be determined in any way (for example, individually, at the level of groups).

In an embodiment, the method includes retrieving by the computing system at least part of the following pages from cached data stored in the computing system in association with the query. However, the cached data may be associated with the query in any way (for example, query alone, query and user); in any case, this feature may also be omitted in a simplified implementation.

In an embodiment, the method includes adding by the computing system at least part of the candidate data being filtered that follow the new page to the cached data in association with the query. However, any amount of the (remaining) filtered candidate data may be added to the cached data (from none to all).

In an embodiment, said step of retrieving by the computing system candidate data includes retrieving the candidate data from the data source according to the query that is limited to the retrieval range following the part of the following pages that has been retrieved from the cached data. However, the retrieval range may start directly after the end point of the last page when no data for the following pages is found in the cached data (or when it is not available).

In an embodiment, the method includes receiving by the computing system a further page request for a current one of the old pages. However, the further page request may be of any type and it may be received in any way (either the same or different with respect to above).

In an embodiment, the method includes extracting by the computing system the start point and the end point of the current old page from the pagination structure. However, this information may be extracted in any way (for example, by identifying the current old page according to its number or offset).

In an embodiment, the method includes retrieving by the computing system further candidate data for the current old page from the data source according to the query that is limited to a further retrieval range from the start point to the end point of the current old page. However, the query may be limited in other ways (for example, only according to the end points of the old pages when their start points are not available).

In an embodiment, the method includes filtering by the computing system the further candidate data into the current old page according to the filtering criteria. However, the further candidate data may be filtered in any way (as above).

In an embodiment, the method includes returning by the computing system a further response to the further page request comprising the current old page. However, the further response may be returned in any way (as above).

In an embodiment, the method includes receiving by the computing system the page request that includes the size of the new page. However, the size of the new page may be provided in any way (for example, with every page request, only at the beginning of the session when it may not be changed or never when it is always set to a default value).

In an embodiment, the method includes receiving by the computing system the page request that is associated with the pagination structure comprising the size of the old pages. However, the size of the old pages may be provided in any way (for example, in a dedicated field or repeated in every rows of the old pages) or it may be omitted at all (when the size of the pages may not be changed).

In an embodiment, the method includes creating by the computing system a fresh version of the pagination structure (comprising the start point and the end point of a fresh version of one or more of the old pages corresponding to the old pages) in response to the size of the new page that is different from the size of the old pages. However, the fresh version of the old pages may be determined in any way (for example, with their number calculated by truncating or rounding the total amount of data of the old pages divided by the size of the new page); in any case, this operation may also be omitted at all (for example, when the size of the pages may not be changed or when in this case the pagination structure is simply cleared).

In an embodiment, said step of creating by the computing system the fresh version of the pagination structure includes retrieving by the computing system still further candidate data for the fresh version of the old pages from the data source according to the query that is limited to a still further retrieval range determined according to the pagination structure. However, the query may be limited in any way (see above), with the still further candidate data that may be retrieved with any number of runs of the query (for example, individually for each pair of fresh version of the old pages, for each fresh version of the old pages or together for all of them).

In an embodiment, said step of creating by the computing system the fresh version of the pagination structure includes filtering by the computing system the still further candidate data according to the filtering criteria thereby determining the start point and the end point of the fresh version of the old pages. However, the still further candidate data may be filtered in any way (as above), with the start/end points of the fresh version of the old pages that may be determined in any way (for example, incrementally or all together).

In an embodiment, said step of creating by the computing system the fresh version of the pagination structure includes adding by the computing system the start point and the end point of the fresh version of the old pages to the fresh version of the pagination structure. However, the fresh version of the pagination structure may be populated in any way (for example, without the start points when they are not taken into account).

In an embodiment, said step of creating by the computing system the fresh version of the pagination structure includes repeating a loop for each of one or more pairs of consecutive first one and second one of the fresh version of the old pages. However, the fresh version of the pagination structure may be created in a different way (for example, all together).

In an embodiment, the loop includes setting by the computing system a start point of the still further retrieval range for the pair according to one of the old pages immediately before the second fresh version of the old pages. However, the start point of the still further retrieval range may be set in different ways (for example, further according to the end point of the still further retrieval range for a previous pair, according to the number of records required to reach the end point of the first fresh version of the old pages).

In an embodiment, the loop includes setting by the computing system an end point of the still further retrieval range for the pair according to one of the old pages immediately after the first fresh version of the old pages. However, the end point of the still further retrieval range may be set in different ways (for example, further according to the end point of the still further retrieval range for a previous pair in this case as well).

Generally, similar considerations apply if the same solution is implemented with an equivalent method (by using similar steps with the same functions of more steps or portions thereof, removing some non-essential steps or adding further optional steps); moreover, the steps may be performed in a different order, concurrently or in an interleaved way (at least in part).

An embodiment provides a computer program that is configured for causing a computing system to perform the above-mentioned method. An embodiment provides a computer program product, the computer program product comprising a computer readable storage medium having program instructions embodied therewith, the program instructions readable by a computing system to cause the computing system to perform the same method. However, the software program may be implemented as a stand-alone module, as a plug-in for a pre-existing software program (for example, the retrieval manager), or even directly in the latter; the same solution may also be deployed as a service that is accessed through any communication network (see below). In any case, the solution according to an embodiment of the present disclosure lends itself to be implemented even with a hardware structure (for example, by electronic circuits integrated in one or more chips of semiconductor material), or with a combination of software and hardware suitably programmed or otherwise configured.

An embodiment provides a system comprising means configured for performing each of the steps of the above-mentioned method. An embodiment provides a system comprising a circuitry (i.e., any hardware suitably configured, for example, by software) configured for performing each of the steps of the same method. However, the computing system may include any number and type of computing machines (for example, of physical and/or virtual type) and it may have any architecture (stand-alone or distributed with the computing machines communicating among them via any local, wide area, global, cellular or satellite network and exploiting any type of wired and/or wireless connections).

Generally, similar considerations apply if the system has a different structure or comprises equivalent software components or it has other operative characteristics. In any case, every component thereof may be separated into more elements, or two or more components may be combined together into a single element; moreover, each component may be replicated to support the execution of the corresponding operations in parallel. Moreover, unless specified otherwise, any interactivity between different components generally does not need to be continuous, and it may be either direct or indirect through one or more intermediaries.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The above-described features may be combined in any way. For example, possible combination of features described above can be the following: claim 2 with claim 1, claim 3 with claim 1 or 2, claim 4 with any claims from 1 to 3, claim 5 with any claims from 1 to 4, claim 6 with claim 5, claim 7 with any claims from 1 to 6, claim 8 with any claims from 1 to 7, claim 9 with any claims from 1 to 8, claim 10 with claim 9, claim 11 with any claims from 2 to 9, claim 12 with any claims from 2 to 11, claim 13 with claim 12, claim 14 with instructions for performing the method of any claims from 1 to 13, and claim 15 with means (or a circuitry) for performing each step of any claim from 1 to 13.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
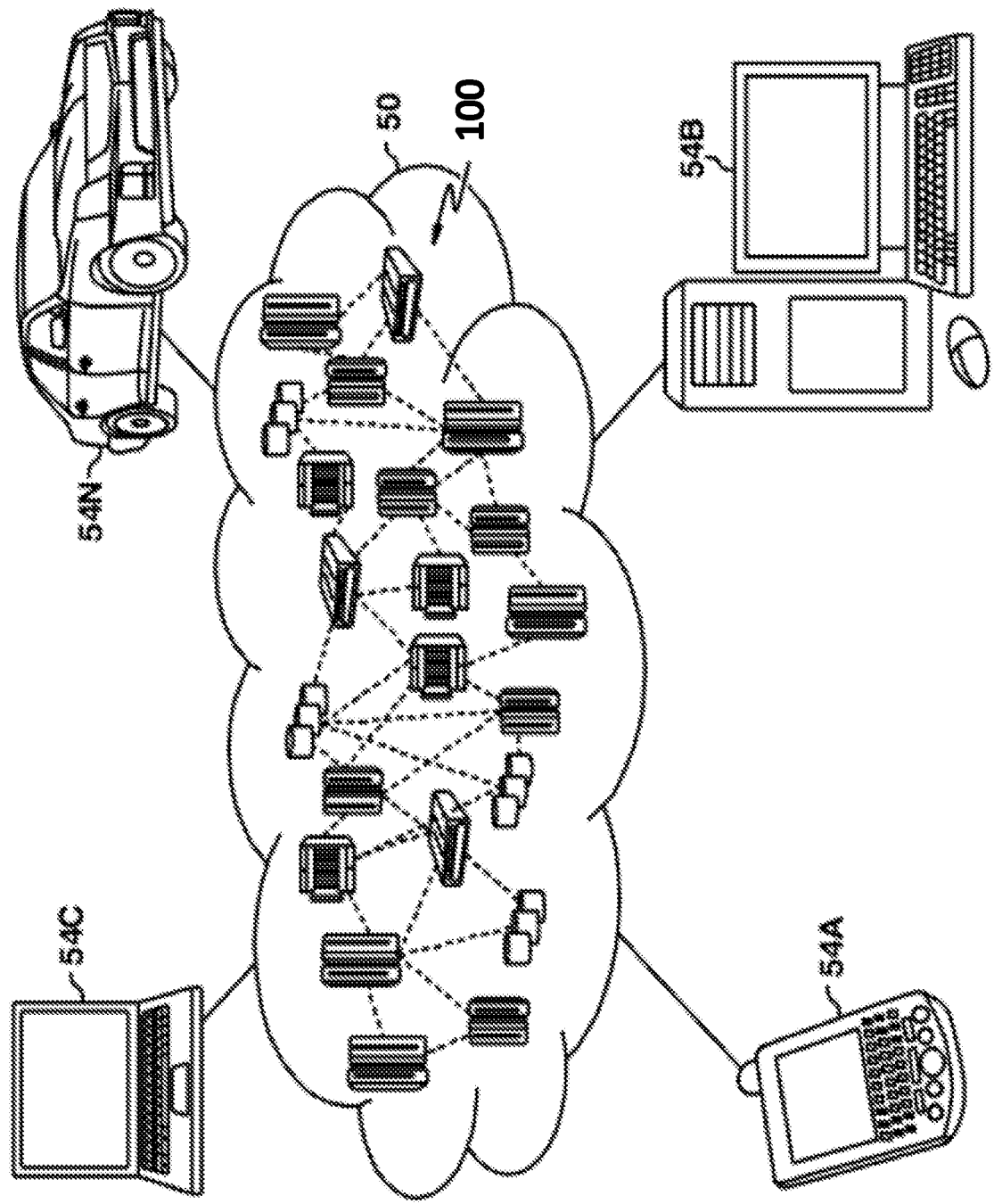
FIG. 5 depicts a cloud computing environment in accordance with an embodiment of the present invention.

Referring now to FIG. 5, illustrative cloud computing environment 50 is depicted. As shown, cloud computing environment 50 includes one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
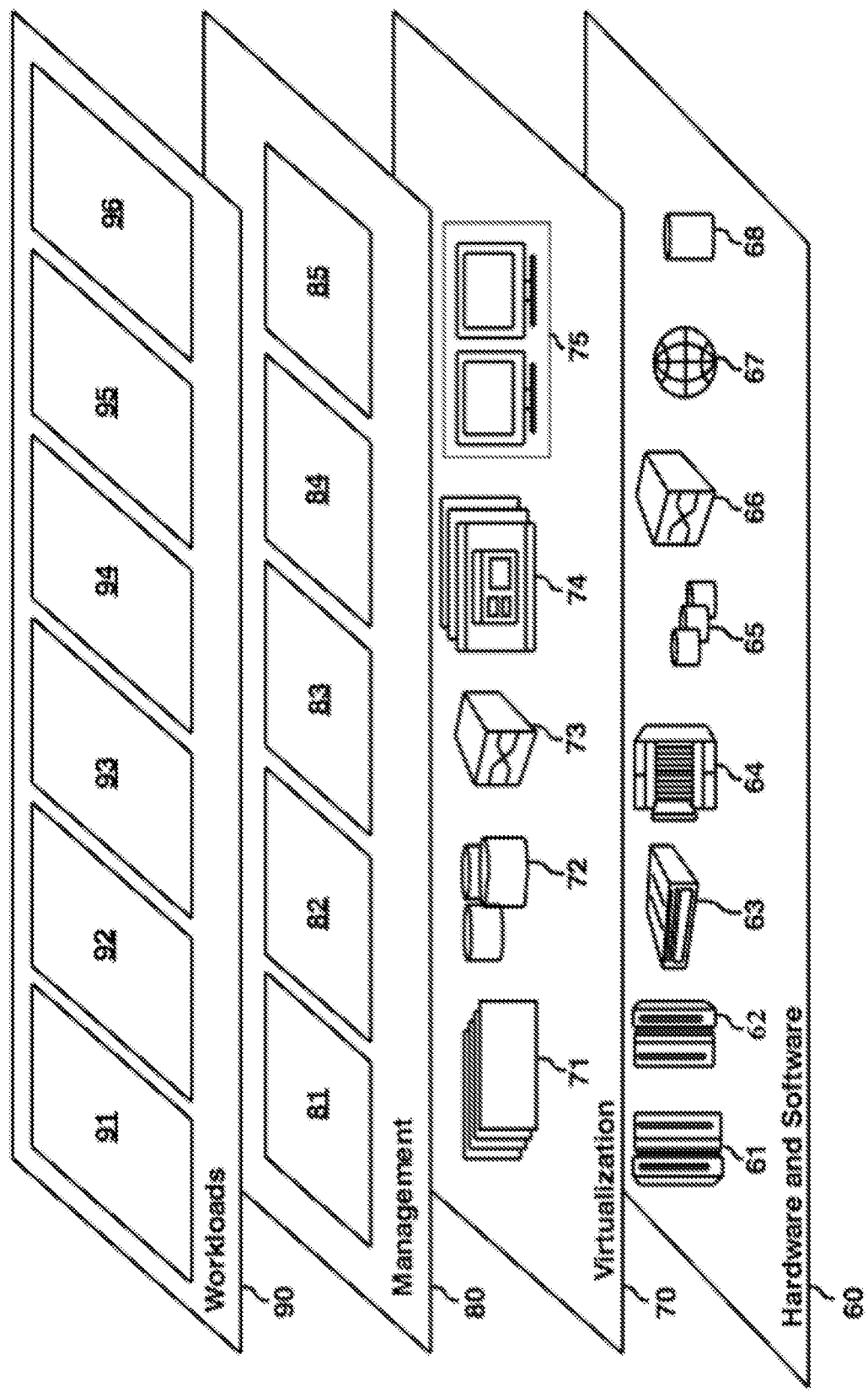
FIG. 6 depicts abstraction model layers in accordance with an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data retrieval system 96. Question answering system 96 may relate to implementing a question answering system which suggests follow-up questions in response to an input question.

The descriptions of the various embodiments of the present invention have been presented for purposes of illustration, but are not intended to be exhaustive or limited to the embodiments disclosed. The terminology used herein was chosen to explain the principles of the one or more embodiments, the practical application or technical improvement over technologies found in the marketplace, or to enable others of ordinary skill in the art to understand the embodiments. Various modifications, additions, substitutions, and the like will be apparent to those of ordinary skill in the art without departing from the scope and spirit of the invention, as defined in the following claims.

What is claimed is:

1. A method for retrieving data stored in a data source at pages having a predetermining size, wherein the method comprises:
    receiving, by a computing system, a page request for a new page within a selected data, wherein the selected data is selected from the data source according to a query, and wherein the page request is associated with a pagination structure comprising an end point in the selected data of a last of one or more previously requested pages within the selected data, and wherein the pagination structure comprises a pagination table which includes sizes of all of the one or more previously requested pages and a row for each of the one or more previously requested pages, and wherein each row includes a number identifying a page of the one or more previously requested pages, an offset of the page being equal to its identifying number multiplied by its size, a start point of the page in the selected data, and an end point of the page in the selected data;
    retrieving, by the computing system, candidate data for one or more following pages, wherein the one or more following pages comprise pages subsequent to the last of one or more previously requested pages up to the new page according to the query, and wherein the query is limited to a retrieval range following the end point of the last of one or more previously requested pages;
    filtering, by the computing system, the candidate data into the new page according to one or more filtering criteria external to the data source thereby determining an end point of the new page, wherein the one or more filtering criteria are defined by one or more security policies that are stored within a security repository separate from the data source and apply to the data source, and wherein the one or more security policies are defined at a level of one or more groups of users authorized to access the data source;
    causing, by the computing system, the pagination structure to be updated into an updated pagination structure according to the end point of the new page; and
    returning, by the computing system, a response to the page request comprising the new page.

2. The method of claim 1, further comprising:
    receiving, by the computing system, the page request associated with the pagination structure, wherein the pagination structure comprises a start point and an end point in the selected data of each of the one or more previously requested pages;
    filtering, by the computing system, the candidate data into the one or more following pages according to the one or more filtering criteria thereby determining a start point and an end point of the one or more following pages; and
    causing, by the computing system, the pagination structure to be updated into the updated pagination structure according to the start point and the end point of the one or more following pages.

3. The method of claim 2, further comprising:
    receiving, by the computing system, a further page request for a current one of the one or more previously requested pages;
    extracting, by the computing system, a start point and an end point of the current one of the one or more previously requested pages from the pagination structure;
    retrieving, by the computing system, further candidate data for the current one of the one or more previously requested pages from the data source according to the query limited to a further retrieval range from the start point to the end point of the current one of the one or more previously requested pages;
    filtering, by the computing system, the further candidate data into the current one of the one or more previously requested pages according to the one or more filtering criteria; and
    returning, by the computing system, a further response to the further page request comprising the current one of the one or more previously requested pages.

4. The method of claim 2, further comprising:
    receiving, by the computing system, the page request comprising a size of the new page and being associated with the pagination structure comprising the size of the one or more previously requested pages;
    in response to the size of the new page being different from the size of the one or more previously requested pages, creating, by the computing system, a fresh version of the pagination structure comprising a start point and an end point of a fresh version of the one or more previously requested pages corresponding to the one or more previously requested pages, wherein creating, by the computing system, the fresh version of the pagination structure comprises:
        retrieving still further candidate data for the fresh version of the one or more previously requested pages from the data source according to the query limited to a still further retrieval range determined according to the pagination structure;
        filtering the still further candidate data according to the one or more filtering criteria thereby determining the start point and the end point of the fresh version of the one or more previously requested pages; and
        adding the start point and the end point of the fresh version of the one or more previously requested pages to the fresh version of the pagination structure.

5. The method of claim 4, wherein creating, by the computing system, the fresh version of the pagination structure comprises:
    repeating, for each of one or more pairs of a first fresh version of the one or more previously requested pages and a consecutive second fresh version of the one or more previously requested pages;
    setting a start point of the still further retrieval range for the pair according to one of the one or more previously requested pages immediately before the consecutive second fresh version of the one or more previously requested pages; and
    setting an end point of the still further retrieval range for the pair according to one of the one or more previously requested pages immediately after the first fresh version of the one or more previously requested pages.

6. The method of claim 1, further comprising:
displaying the new page onto a monitor in response to the response to the page request.

7. The method of claim 1, further comprising:
receiving, by the computing system, the page request from a further computing system over a communication network; and
returning, by the computing system, the response to the page request to the further computing system over the communication network.

8. The method of claim 1, further comprising:
receiving, by the computing system, the page request comprising the pagination structure; and
returning, by the computing system, the response to the page request, wherein the response comprises the updated pagination structure.

9. The method of claim 8, further comprising:
receiving, by the computing system, the page request comprising the pagination structure, wherein the pagination structure is in encrypted form;
decrypting, by the computing system, the pagination structure;
encrypting, by the computing system, the updated pagination structure to put the updated pagination structure in encrypted form; and
returning, by the computing system, the response to the page request comprising the updated pagination structure in encrypted form.

10. The method of claim 1, further comprising:
iterating, until completing the new page by the computing system, a loop comprising:
retrieving, by the computing system, the candidate data according to the query limited to the retrieval range following the end point of the last one or more previously requested pages at a first iteration of the loop; and
retrieving, by the computing system, the candidate data according to the query limited to a retrieval range following an end point of the candidate data at a previous iteration of the loop and having a size corresponding to missing data for completing the new page.

11. The method of claim 1, further comprising:
receiving, by the computing system, the page request for a user; and
determining, by the computing system, the filtering criteria according to the user.

12. The method of claim 1, further comprising:
retrieving, by the computing system, at least part of the one or more following pages from cached data stored in the computing system in association with the query; and
adding, by the computing system, at least part of the candidate data to the cached data in association with the query.

13. The method of claim 12, wherein retrieving candidate data comprises:
retrieving, by the computing system, the candidate data from the data source according to the query limited to the retrieval range following the at least part of the one or more following pages being retrieved from the cached data.

14. A computer program product for retrieving data stored in a data source at pages having a predetermining size, the computer program product comprising a computer readable storage medium having program instructions embodied therewith, the program instructions readable by a computing system to cause the computing system to perform a method comprising:

receiving, by a computing system, a page request for a new page within a selected data, wherein the selected data is selected from the data source according to a query, and wherein the page request is associated with a pagination structure comprising an end point in the selected data of a last of one or more previously requested pages within the selected data, and wherein the pagination structure comprises a pagination table which includes sizes of all of the one or more previously requested pages and a row for each of the one or more previously requested pages, and wherein each row includes a number identifying a page of the one or more previously requested pages, an offset of the page being equal to its identifying number multiplied by its size, a start point of the page in the selected data, and an end point of the page in the selected data;
retrieving, by the computing system, candidate data for one or more following pages, wherein the one or more following pages follow the last of one or more previously requested pages up to the new page according to the query, and wherein the query is limited to a retrieval range following the end point of the last of one or more previously requested pages;
filtering, by the computing system, the candidate data into the new page according to one or more filtering criteria external to the data source thereby determining an end point of the new page, wherein the one or more filtering criteria are defined by one or more security policies that are stored within a security repository separate from the data source and apply to the data source, and wherein the one or more security policies are defined at a level of one or more groups of users authorized to access the data source;
causing, by the computing system, the pagination structure to be updated into an updated pagination structure according to the end point of the new page; and
returning, by the computing system, a response to the page request comprising the new page.

15. The computer program product of claim 14, further comprising:
receiving, by the computing system, the page request associated with the pagination structure, wherein the pagination structure comprises a start point and an end point in the selected data of each of the one or more previously requested pages;
filtering, by the computing system, the candidate data into the one or more following pages according to the one or more filtering criteria thereby determining a start point and an end point of the one or more following pages; and
causing, by the computing system, the pagination structure to be updated into the updated pagination structure according to the start point and the end point of the one or more following pages.

16. The computer program product of claim 14, further comprising:
displaying the new page onto a monitor in response to the response to the page request.

17. The computer program product of claim 14, further comprising:
receiving, by the computing system, the page request from a further computing system over a communication network; and
returning, by the computing system, the response to the page request to the further computing system over the communication network.

18. A computer system for retrieving data stored in a data source at pages having a predetermining size, the computer system comprising:
- one or more processors, one or more computer-readable memories, one or more computer-readable tangible storage devices, and program instructions stored on at least one of the one or more computer-readable tangible storage devices for execution by at least one of the one or more processors via at least one of the one or more memories, the program instructions comprising:
- program instructions to receive a page request for a new page within a selected data, wherein the selected data is selected from the data source according to a query, and wherein the page request is associated with a pagination structure comprising an end point in the selected data of a last of one or more previously requested pages within the selected data, and wherein the pagination structure comprises a pagination table which includes sizes of all of the one or more previously requested pages and a row for each of the one or more previously requested pages, and wherein each row includes a number identifying a page of the one or more previously requested pages, an offset of the page being equal to its identifying number multiplied by its size, a start point of the page in the selected data, and an end point of the page in the selected data;
- program instructions to retrieve candidate data for one or more following pages, wherein the one or more following pages follow the last of one or more previously requested pages up to the new page according to the query, and wherein the query is limited to a retrieval range following the end point of the last of one or more previously requested pages;
- program instructions to filter the candidate data into the new page according to one or more filtering criteria external to the data source thereby determining an end point of the new page, wherein the one or more filtering criteria are defined by one or more security policies that are stored within a security repository separate from the data source and apply to the data source, and wherein the one or more security policies are defined at a level of one or more groups of users authorized to access the data source;
- program instructions to cause the pagination structure to be updated into an updated pagination structure according to the end point of the new page; and
- program instructions to return a response to the page request comprising the new page.

19. The computer system of claim 18, further comprising:
- program instructions to receive the page request associated with the pagination structure, wherein the pagination structure comprises a start point and an end point in the selected data of each of the one or more previously requested pages;
- program instructions to filter the candidate data into the one or more following pages according to the one or more filtering criteria thereby determining a start point and an end point of the one or more following pages; and
- program instructions to cause the pagination structure to be updated into the updated pagination structure according to the start point and the end point of the one or more following pages.

20. The computer system of claim 18, further comprising:
- program instructions to display the new page onto a monitor in response to the response to the page request.

* * * * *